United States Patent
Watanabe et al.

(10) Patent No.: US 7,691,774 B2
(45) Date of Patent: Apr. 6, 2010

(54) HYDROGENATION DESULFURIZATION ISOMERIZATION CATALYST, PROCESS FOR PRODUCING THE SAME AND METHOD OF DESULFURIZATION ISOMERIZATION FOR SULFUROUS HYDROCARBON OIL

(75) Inventors: Katsuya Watanabe, Satte (JP); Takao Kimura, Satte (JP); Takahito Kawakami, Satte (JP); Kouji Baba, Satte (JP)

(73) Assignees: Petroleum Energy Center, Tokyo (JP); Cosmo Oil Co., Ltd., Tokyo (JP)

( * ) Notice: Subject to any disclaimer, the term of this patent is extended or adjusted under 35 U.S.C. 154(b) by 1284 days.

(21) Appl. No.: 10/506,802

(22) PCT Filed: Feb. 28, 2003

(86) PCT No.: PCT/JP03/02369

§ 371 (c)(1),
(2), (4) Date: Sep. 7, 2004

(87) PCT Pub. No.: WO03/076071

PCT Pub. Date: Sep. 18, 2003

(65) Prior Publication Data

US 2005/0103685 A1 May 19, 2005

(30) Foreign Application Priority Data

Mar. 8, 2002 (JP) .............................. 2002-063395

(51) Int. Cl.
*B01J 27/045* (2006.01)
*B01J 23/00* (2006.01)
*B01J 23/44* (2006.01)
*B01J 23/56* (2006.01)
*C07C 5/22* (2006.01)

(52) U.S. Cl. .............. 502/223; 502/217; 502/325; 502/327; 502/332; 502/333; 502/334; 208/138; 208/217

(58) Field of Classification Search ................ 208/138, 208/217; 502/217, 223, 325, 327, 332–334
See application file for complete search history.

(56) References Cited

U.S. PATENT DOCUMENTS 2,818,394 A * 12/1957 Murray et al. ............. 502/334
6,107,235 A * 8/2000 Matsuzawa ................ 502/217
6,737,380 B2 * 5/2004 Watanabe et al. ........... 502/217

FOREIGN PATENT DOCUMENTS

| EP | 1130079 A1 | 9/2001 |
| JP | 2001-353444 A | 12/2001 |
| JP | 2002-301372 A | 10/2002 |

OTHER PUBLICATIONS

Japanese Office Action for JP 2002-063395, dated Sep. 10, 2007.

\* cited by examiner

*Primary Examiner*—Ngoc-Yen M Nguyen
*Assistant Examiner*—Diana J Liao
(74) *Attorney, Agent, or Firm*—Sughrue Mion, PLLC

(57) ABSTRACT

A process for producing a catalyst for hydrodesulfurization and isomerization of a sulfur-containing hydrocarbon oil, which comprises supporting palladium on a composition comprising a platinum-supported sulfated zirconia and alumina.

2 Claims, No Drawings

HYDROGENATION DESULFURIZATION ISOMERIZATION CATALYST, PROCESS FOR PRODUCING THE SAME AND METHOD OF DESULFURIZATION ISOMERIZATION FOR SULFUROUS HYDROCARBON OIL

TECHNICAL FIELD

The present invention relates to a catalyst for simultaneously achieving hydrodesulfurization and isomerization of a sulfur compound-containing hydrocarbon oil as a target and a process for producing the same. The invention also includes a method for hydrodesulfurization and isomerization of a light hydrocarbon oil using the catalyst, which can be effected with simpler facilities than in conventional techniques and is economically advantageous.

BACKGROUND ART

Isomerization of a light hydrocarbon oil is a technique which has conventionally been employed extensively in the field of petroleum refining industry and petrochemical industry. With the trend toward engine performance elevation in motor vehicles and aircraft especially in recent years, the gasoline for use as a fuel therein have come to be required to have a high octane number and hence the isomerization is becoming important for satisfying the requirement. The so-called isomerized gasoline has hitherto been used as one of light blend stocks for gasoline, the isomerized gasoline being obtained by isomerizing a light naphtha that is a light hydrocarbon oil so as to have an improved octane number.

Many researches have conventionally been conducted on methods for isomerizing light naphthas, and various catalysts for use in the isomerization reactions are known. Of these, solid acid catalysts can be mentioned as the most useful isomerization catalysts. Processes for producing solid acid catalysts and methods of isomerization using the catalysts are disclosed, for example, in JP-B-5-29503 and JP-B-6-29199.

However, light naphthas obtained by distillation or cracking of crude oil, usually contain organosulfur compounds in an amount of about 200 to 700 ppm and these organosulfur compounds function as a catalyst poison for solid acid catalysts. Therefore, direct isomerization of light naphthas has not been a process suitable for industrial use in view of catalyst life. In processes which are presently carried out, a two-stage treatment is conducted, wherein a light naphtha containing sulfur compounds is treated with a Co—Mo based or Ni—Mo based hydrodesulfurization catalyst to convert organosulfur compounds into hydrogen sulfide and the hydrogen sulfide is separated from the product oil to thereby prepare a desulfurized light naphtha having a sulfur content reduced to several ppm or lower; and thereafter this desulfurized light naphtha is used as a feedstock oil to be isomerized. Namely, in the current processes for the isomerization of a light hydrocarbon oil, the step of hydrodesulfurization is indispensable as a pretreatment for the step of isomerization.

If a catalyst for use in the isomerization of a light hydrocarbon oil can be replaced with a catalyst capable of simultaneously achieving hydrodesulfurization and isomerization, the hydrodesulfurization step which has been indispensable to isomerization processes can be omitted, making it possible to conduct the isomerization more economically with simpler facilities than in conventional techniques. Specifically, it is desirable to enable hydrodesulfurization and isomerization reactions to be conducted simultaneously by loading an isomerization catalyst having sulfur tolerance into an existing reaction column for the isomerization of a light hydrocarbon oil and feeding a light hydrocarbon oil containing organosulfur compounds as a feedstock oil to be isomerized.

As a catalyst satisfying such a requirement, recently disclosed is a catalyst in which sulfuric acid and a transition metal such as platinum are incorporated into a molded form of zirconia and alumina (WO00/12652). However, the sulfur tolerance thereof is not sufficiently high.

The present inventors have also studied catalysts of sulfated zirconia in combination with a platinum group element. They have found catalysts capable of simultaneously achieving the desulfurization and isomerization of a light hydrocarbon and thus proposed methods for hydrodesulfurization and isomerization using the catalysts (JP-A-2000-233132 and JP-A-2000-234093), but a catalyst having higher activity and higher sulfur tolerance has been still required.

DISCLOSURE OF THE INVENTION

As a result of the continued studies after the disclosure of the above invention, the present inventors have found that a sulfated zirconium-alumina catalyst containing a specific platinum on which palladium is further supported enables simultaneous hydrodesulfurization and isomerization of a light hydrocarbon oil containing sulfur compounds and a process wherein the hydrodesulfurization step prior to the isomerization process is omitted can be employed as a highly practical process.

Specifically, in order to additionally impart hydrodesulfurizing ability to an isomerization catalyst, useful is a technique of supporting palladium on a mixture containing a sulfated zirconium and alumina on which platinum has been supported. That is, by introducing platinum and palladium into a catalyst in this order, a catalyst having both of excellent hydrodesulfurizing ability and isomerizing ability is obtained. The inventors have further continued to study the catalyst and found that a catalyst of high activity can be produced by suitably controlling the content of platinum and palladium in the catalyst produced by the sequentially supporting technique, and thus, they have accomplished the invention.

An object of the invention is to provide, based on the utilization of the above new findings obtained by the inventors, a catalyst capable of treating a hydrocarbon oil having a high sulfur concentration stably for a long period of time as compared with conventional catalysts, in the process for producing a catalyst capable of simultaneously achieving the hydrodesulfurization and isomerization of a light hydrocarbon oil containing sulfur, and a process for producing the same. Another object of the invention is to provide a method for hydrodesulfurization and isomerization of a sulfur-containing hydrocarbon oil using the catalyst.

The process for producing a catalyst for hydrodesulfurization and isomerization of a sulfur-containing hydrocarbon oil according to the invention comprises supporting palladium on a mixture comprising a platinum-supported sulfated zirconia and alumina. Specific illustration thereof with reference to operations is the production process which comprises the following steps:

(1) an alumina-mixing step of mixing a platinum-supported sulfated zirconium hydroxide and pseudoboehmite;

(2) a molding step of molding the resulting mixture into a catalyst form;

(3) a calcining step of calcining the molded form to stabilize it; and (4) a palladium-supporting step of supporting palladium.

The catalyst for desulfurization and isomerization of a sulfur-containing hydrocarbon oil according to the invention is a catalyst which is produced by the above process and which has a platinum content of 0.05 to 5% by weight, a palladium content of 0.05 to 10% by weight, and a specific surface area of 50 to 200 m$^2$/g.

The method for hydrodesulfurization and isomerization of a sulfur-containing hydrocarbon oil according to the invention using the catalyst comprises bringing a light hydrocarbon oil having a sulfur content of 700 ppm by weight or lower and hydrogen into contact with the above catalyst under reaction conditions: a temperature of 160 to 300° C., a pressure of 1.0 to 10.0 MPa, an LHSV of 0.1 to 10 h$^{-1}$, and a hydrogen/oil ratio of 100 to 1,000 NL/L to achieve isomerization and desulfurization simultaneously.

BEST MODE FOR CARRYING OUT THE INVENTION

The following will explain the invention in detail.

[Sulfated Zirconium Hydroxide]

The zirconium hydroxide to be used in the invention is a hydroxide or a partially oxidized hydroxide of zirconium. Zirconium hydroxides and partially oxidized zirconium hydroxides exist in forms including $Zr(OH)_4$, $Zr(OH)_2$, $Zr(OH)_3$ and $ZrO(OH)_2$, and any of these can be used. Preferred are $Zr(OH)_4$ and $ZrO(OH)_2$. These hydroxides or partially oxidized hydroxides of zirconium may be hydrates.

The hydroxide or partially oxidized hydroxide of zirconium is sulfated to prepare a sulfate group-containing zirconium hydroxide. Examples of a treating agent which gives a sulfate group include sulfuric acid, ammonium sulfate, sulfurous acid, ammonium sulfite, hydrogen sulfide, sulfurous acid gas, and the like. Preferred are Sulfuric acid and ammonium sulfate. Any methods can be used for the sulfation. Examples thereof include an adsorption method, an impregnation method, and a mixing method. With regard to the sulfation method, there is no special limitation in a method of dissolving the treating agent, solvent, treating period, and temperature, and they can be suitably selected within the range in which the advantages of the invention are obtained.

[Platinum]

In the process for producing the catalyst of the invention, the other metal may be present at the time when platinum is supported on the sulfated zirconium hydroxide unless the advantages of the invention is inhibited. The other metal may be palladium, ruthenium, iridium, nickel, cobalt and the like, and two or more of these metals may be incorporated. Techniques for supporting platinum is not particularly limited but an impregnation method and an ion-exchange method well-known to persons skilled in the art are representative methods therefor. Any methods may be adopted as far as they can support platinum on a sulfate group-supported zirconium hydroxide highly dispersively and homogeneously.

The platinum compound for use in the supporting of platinum may be any of various water soluble salts, such as chloride, bromide, iodide, sulfate, nitrate, and ammine complex salts. The supporting of platinum may be conducted not only after the aforementioned sulfation of the above zirconium hydroxide but also before the treatment or at the same time. The performance of the final catalysts are about the same even when they are supported in any order.

The content of platinum is, as a ratio in the catalyst finally obtained, is 0.05 to 5% by weight, preferably 0.1 to 3% by weight.

For obtaining an effect as a solid acid catalyst, the content of 0.05% by weight or more is preferred. The content of 5% by weight or less is preferred because dispersibility of the active metals is maintained and activity of the solid acid catalyst is obtained.

[Mixing with alumina]

As the alumina for use in the invention, various forms of aluminum hydroxides or hydrated aluminum hydroxides, such as pseudoboehmite, γ-alumina, η-alumina and α-alumina, can be used, but for obtaining a practical crush strength as a catalyst, the use of pseudoboehmite is preferred. In general, an alumina having a pseudoboehmite structure is available in a powder form or in a sol form which is a dispersion in a liquid.

In the invention, when pseudoboehmite is used as the alumina, the following method of the use is suitable, for example. Namely, after pseudoboehmite has been added to and mixed with the platinum-supported sulfated zirconium hydroxide, a medium for molding is added and the whole is further mixed and then molded to obtain a molded form for catalyst. At that time, as far as a practical crush strength as a catalyst is obtained, an alumina having the other crystalline form can be added in addition to pseudoboehmite. As far as the advantage of the catalyst of the invention is obtained, the other metal oxide may be, of course, added.

For the mixing of the platinum-supported sulfated zirconium hydroxide with pseudoboehmite, a kneader generally employed for catalyst production can be used, but any mixing means may be used as far as crush strength as a catalyst on a practical level is obtained.

As a medium to be added after the addition and mixing of the platinum-supported sulfated zirconium hydroxide with pseudoboehmite, various solvents can be used alone or as a mixture of two or more thereof, the solvents including alcoholic organic solvents such as methanol and ethanol, acidic solvents such as sulfuric acid, dilute sulfuric acid, nitric acid, hydrochloric acid, and acetic acid, and the like. The most easily available and also preferable in use is water.

Alternatively, a molded form of the sulfated zirconium hydroxide containing platinum can be obtained by mixing the sulfated zirconium hydroxide with pseudoboehmite and then adding an aqueous solution containing platinum thereto, followed by mixing and molding.

The ratio of the platinum-supported sulfated zirconium hydroxide to the alumina (zirconium oxide/alumina) is preferably in the range of 97/3 to 60/40 (unit: % by weight), preferably 95/5 to 80/20 in terms of the ratio in the solid acid catalyst finally obtained.

Since an alumina plays a role as a binder, the amount of 3% by weight or more is preferred because a binding power of the catalyst becomes strong. On the other hand, the amount of the alumina of 40% by weight or less is preferred because crush strength of the catalyst is obtained and a relative amount of the sulfated zirconium hydroxide can be maintained to secure a necessary solid acid amount.

[Molding and Calcination of Platinum-Supported Sulfated Zirconia-Alumina Composition]

The mixture of the platinum-supported sulfated zirconium hydroxide and alumina obtained as above is subsequently molded into a catalyst precursor form having a suitable form as a catalyst by a technique known to persons skilled in the art. Examples of the technique include an extrusion molding method, a rolling granulation method, a dropping-into-oil method, and the like. The extrusion molding method is preferred.

The molded form is not particularly limited in size, but usually the mixture is molded into a size having a diameter of the catalyst cross-section of 1 to 5 mm. Especially when an extrusion-molded product having a cylindrical, four-cusped or similar shape is to be produced, it is easy to obtain a catalyst having a length of about 1 to 20 mm, which is practically advantageous.

The molded catalyst precursor form is dried and further subjected to calcination for stabilization. The calcination is conducted by heating the precursor form under an oxidizing atmosphere at a temperature in the range of 200 to 800° C., preferably 250 to 750° C., over a period of 0.5 to 10 hours.

The calcining temperature of the lower limit, i.e., 200° C., or higher is preferred because the crush strength is high when the molded form is converted into a catalyst. On the other hand, the temperature of the upper limit, i.e., 800° C., or lower is preferred because the sulfate groups incorporated are prevented from volatilizing and a catalyst having solid acidity is obtained.

The calcined molded form is dehydrated completely or incompletely to be converted into a zirconium oxide or a partially oxidized zirconium hydroxide, but as far as the calcination is conducted within the range of 200° C. to 800° C., the oxide or hydroxide in any form may be suitable.

[Supporting of Palladium]

The supporting of palladium on the platinum-supported sulfated zirconia-alumina thus obtained can be conducted by general methods such as an impregnation method, an ion-exchange method, or an adsorption method. Any method can be adopted as far as it can support palladium on the molded form highly dispersively and homogeneously.

As a salt which is a palladium supplying source, use can be made of a hydrochloride such as palladium chloride $PdCl_2$, palladium ammonium tetrachloride $(NH_4)_2PdCl_4$, or palladium ammonium hexachloride $(NH_4)_2PdCl_6$; an acetate such as palladium acetate $Pd(CH_3COO)_2$; a sulfate such as palladium sulfate $PdSO_4$, $PdSO_4.nH_2O$; a nitrate such as palladium nitrate $Pd(NO_3)_2$; a palladium salt such as tetraammine dichloropalladium $Pd(NH_3)_4Cl_2$ $nH_2O$. Preferred is a hydrochloride, sulfate, nitrate, acetate, or the like salt of palladium and most preferred is a palladium hydrochloride.

The supported amount of palladium is preferably 0.05 to 10% by weight, more preferably 0.1 to 5% by weight in terms of the ratio in the solid acid catalyst finally obtained.

The amount of 0.05% by weight or more is preferred because the value of adding palladium as a solid acid catalyst, i.e., the purpose of realizing both of sulfur tolerance and isomerization activity can be achieved. The amount of 5% by weight or less is preferred because dispersibility of palladium is maintained and catalyst activity is obtained.

[Calcination after Supporting of Palladium]

The palladium-supported product of the platinum-supported sulfated zirconia-alumina is dried and then calcined to thereby obtain a final catalyst. The calcination is conducted by heating the product under an oxidizing atmosphere at a temperature in the range of 100 to 800° C., preferably from 120 to 750° C., over a period of 0.5 to 10 hours.

The calcination temperature of 100° C. or higher is preferred because water can be evaporated and hence affinity between palladium and the molded form becomes strong, whereby effusion of palladium is inhibited. The calcination temperature of 800° C. or lower is preferred because the supported palladium does not aggregate, its highly dispersed state is maintained, and as a result, a catalyst of high activity is obtained.

[Composition of Final Catalyst]

The content of the sulfate group in the catalyst produced according to the process for producing the catalyst of the invention varies depending on treating conditions such as the kind of the sulfation-treating agent, its concentration, and processing history, especially temperature and period of heating, but it is desirable to be in the range of 0.1 to 5% by weight, preferably 0.5 to 4% by weight in terms of sulfur.

The sulfur content of 0.1% by weight or more is preferred because the catalyst has sufficient acidity and functions as a solid acid catalyst and hence catalyst activity is enough. The content of 5% by weight or less is preferred because the sulfate group can be prevented from excessively covering the zirconia surface and accumulating on the surface to deactivate active sites and hence catalyst activity is enough.

The sulfur content in the catalyst is measured by burning a sample in an oxygen stream to oxidize the sulfur contained in the sample to convert it into sulfurous acid gas ($SO_2$), removing water and dust, and then detecting the amount of $SO_2$ with an infrared detector, e.g., a solid-state detector. According to this analytical method, the sulfur content in a sample can be determined in the concentration range of 0.001 to 99.99%.

The catalyst of the invention preferably has a specific surface area in the range of 50 to 200 $m^2/g$, preferably 60 to 160 $m^2/g$.

When the specific surface area is 50 $m^2/g$ or larger, the active metals are present in a highly dispersed state to give a larger area of contact with reactants, and hence the catalyst can be utilized as a solid acid catalyst. On the other hand, the specific surface area of 200 $m^2/g$ or smaller is preferred because the catalyst has solid acidity and crush strength as a catalyst can be maintained.

The specific surface area of the catalyst can be calculated by measuring an adsorbed amount according to the nitrogen adsorption method using a measuring apparatus known to persons skilled in the art.

The catalyst of the invention preferably has a crush strength of 0.2 to 5.0 kg/2 mm, more preferably 0.3 to 3.0 kg/2 mm.

The crush strength of 0.2 kg/2 mm or higher is preferred because the catalyst can be prevented from being destroyed by its own weight when packed into a practical apparatus. The crush strength of 5.0 kg/2 mm or lower is preferred because a catalyst can be obtained which generally has a large specific surface area and a sufficiently large number of active sites necessary for reactions and which, as a result, has high activity.

By following the aforementioned process for production, i.e., by conducting the procedure of first preparing a platinum-supported sulfated zirconia-alumina and then supporting palladium, a catalyst capable of achieving desulfurization and isomerization simultaneously is obtained. The reason for this fact is not clear but the following is presumed.

That is, a platinum-supported sulfated zirconia has isomerization activity but, because it alone does not have desulfurizing ability, it cannot achieve isomerization and desulfurization for a long period and is deactivated within a short period when brought into contact with a sulfur-containing hydrocarbon.

On the other hand, in the catalyst obtained by first preparing a platinum-supported sulfated zirconia-alumina and then supporting palladium, palladium is located on the alumina surface and the palladium-alumina acts as a new desulfurization site. It is considered that the reason why the catalyst of the invention exhibits the ability of isomerization and desulfurization for a long period is that such role-sharing is attained.

The positions of these metals can be observed by an X-ray micro analyzer (EPMA: Electron Probe Micro Analyzer). Based on the observation, a tendency can be confirmed that platinum is located on zirconia and palladium is located on alumina, respectively.

[Method for Hydrodesulfurization and Isomerization]

A light hydrocarbon oil containing organosulfur compounds, such as a straight-run light naphtha taken through atmospheric distillation apparatus of a crude-oil, a light naphtha separated from a whole naphtha likewise taken through atmospheric distillation apparatus of a crude-oil, or a Merox naphtha obtained by subjecting a light naphtha to the Merox treatment, is suitable as the feedstock oil to be desulfurized and simultaneously isomerized using the catalyst of the invention.

An especially suitable feedstock oil is a light naphtha having an ASTM distillation temperature of 25 to 130° C., preferably 25 to 110° C.

With respect to the content of organosulfur compounds, a light naphtha having an organosulfur content of 700 ppm by weight or lower, preferably about 10 to 500 ppm by weight, more preferably about 10 to 200 ppm by weight, can be suitably used. It is a matter of course that a light hydrocarbon oil having a sulfur content of less than 10 ppm can also be used as the feedstock oil.

[Examples of Organosulfur Compounds]

Representative examples of the organosulfur compounds contained in light naphthas include thiol compounds, R—SH, such as 2-propanethiol, $(CH_3)_2CH$—SH, and ethanethiol, $C_2H_5$—SH, sulfide compounds, R—S—R, such as methyl ethyl sulfide, $CH_3$—S—$C_2H_5$, disulfide compounds, R—SS—R, such as ethyl isopropyl disulfide, $C_2H_5$—SS—$CH(CH_3)_2$, and the like. Using the catalyst of the invention, these sulfur compounds can be removed simultaneously with the isomerization of the light hydrocarbon oil.

[Components in the Feedstock Oil]

From the standpoint of maintaining the catalytic activity over a longer period, it is preferred that the amounts of aromatics, unsaturated hydrocarbons, and higher hydrocarbons in the light naphtha to be treated be small. The amount of benzene is preferably 5% by volume or smaller, more preferably 3% by volume or smaller. The amount of naphthenes is preferably 12% by volume or smaller, more preferably 9% by volume or smaller. That of $C_7$ compounds is preferably 15% by volume or smaller, more preferably 10% by volume or smaller.

[Reaction Conditions for Hydrodesulfurization and Isomerization]

Conditions for the hydrodesulfurization and isomerization using the catalyst of the invention are as follows:
Reaction temperature: 160 to 300° C., preferably 180 to 250° C.
Reaction pressure: 1.0 to 10.0 MPa, preferably 1.4 to 4.5 MPa
LHSV: 0.1 to 10 $h^{-1}$, preferably 0.5 to 5 $h^{-1}$
Hydrogen/oil ratio: 100 to 1,000 NL/L, preferably 150 to 800 NL/L The reaction temperature of 160° C. or higher is preferred because catalyst life is prolonged. On the other hand, the temperature of 300° C. or lower is preferred because the feedstock oil is prevented from decomposition and the yield of the product oil does not decrease.

The other conditions, i.e., reaction pressure, LHSV, and hydrogen/oil ratio, are almost the same as the conditions for the isomerization of light hydrocarbon oils, which have been conducted hitherto.

The catalyst of the invention can be used in place of isomerization catalysts heretofore in use, whereby not isomerization alone but hydrodesulfurization and isomerization can be simultaneously conducted. Namely, the organosulfur compounds contained in the feedstock oil can be hydrodesulfurized into hydrogen sulfide to reduce the sulfur content to several ppm or lower and, simultaneously therewith, a component having a low octane number can be isomerized into a component having a high octane number. Thus, a product oil containing substantially no sulfur compound and having an improved octane number can be obtained.

EXAMPLES

The following will describe the invention in more detail with reference to Examples, but the invention should not be construed as being limited to these Examples unless it exceeds the gist of the invention.

Example 1

Production of Catalyst "A"

(1) Preparation of Sulfated Zirconium Hydroxide

To 4,000 g of 1N sulfuric acid was added 400 g of a zirconium hydroxide ($Zr(OH)_4$), followed by stirring for 30 minutes. Thereafter, the mixture was filtered and the resulting solid material was dried at 110° C. for a whole day and night to obtain 452 g of a sulfated zirconium hydroxide containing a sulfate group.

(2) Supporting of Platinum on Sulfated Zirconium Hydroxide

To an aqueous solution of 2.7 g of chloroplatinic acid dissolved therein was added 375 g of the above sulfated zirconium hydroxide, whereby impregnation with the Pt salt was effected. Thereafter, drying at 110° C. for a whole day and night afforded 377 g of a platinum-supported sulfated zirconium hydroxide.

(3) Molding of Catalyst

After 377 g of the platinum-supported sulfated zirconium hydroxide was thoroughly mixed with 68.7 g of commercially available pseudoboehmite (manufactured by Catalysts & Chemicals Ind. Co., Ltd.), 200 g of water was added thereto, followed by kneading. The kneaded mixture was extruded through a molding machine at a diameter of 1.8 mm. The extruded kneaded product was dried at 110° C. for 2 hours to obtain 446 g of a precursor of a molded form.

(4) Stabilization of Molded Form

The precursor of a molded form was calcined in a muffle furnace at 600° C. for 3 hours to obtain 354 g of a stabilized molded form.

(5) Supporting of Palladium on Molded Form

With 120 g of an aqueous solution containing 2.9 g of palladium chloride dissolved therein was impregnated 354 g of the molded form for 30 minutes. Thereafter, the impregnated molded form was dried under a nitrogen stream and then calcined at 450° C. for 3 hours to obtain 355 g of a catalyst "A" as a final product.

Example 2

Production of Catalyst "B"

A production process was conducted in the same manner as in Example 1 with the exception that a mixed aqueous solution of 2.7 g of chloroplatinic acid and 0.5 g of palladium chloride was used instead of the aqueous solution containing 2.7 g of chloroplatinic acid dissolved therein in the step of (2) Supporting of platinum on sulfated zirconium hydroxide in Example 1, whereby 355 g of a catalyst "B" was obtained.

Example 3

Production of Catalyst "C"

A production process was conducted in the same manner as in Example 1 with the exception that an aqueous solution containing 13.3 g of chloroplatinic acid dissolved therein was used instead of the aqueous solution containing 2.7 g of chloroplatinic acid dissolved therein in the step of (2) Supporting of platinum on sulfated zirconium hydroxide in Example 1 and 1.2 g of palladium chloride was used instead of 2.9 g of palladium chloride in the step of (5) Supporting of palladium, whereby 363 g of a catalyst "C" was obtained.

Example 4

Production of Catalyst "D"

A production process was conducted in the same manner as in Example 1 with the exception that an aqueous solution containing 1.8 g of chloroplatinic acid dissolved therein was used instead of the aqueous solution containing 2.7 g of chloroplatinic acid dissolved therein in the step of (2) Supporting of platinum on sulfated zirconium hydroxide in Example 1 and 14.7 g of palladium chloride was used instead of 2.9 g of palladium chloride in the step of (5) Supporting of palladium, whereby 364 g of a catalyst "D" was obtained.

Example 5

Production of Catalyst "E"

A production process was conducted in the same manner as in Example 1 with the exception that an aqueous solution containing 22.1 g of chloroplatinic acid dissolved therein was used instead of the aqueous solution containing 2.7 g of chloroplatinic acid dissolved therein in the step of (2) Supporting of platinum on sulfated zirconium hydroxide in Example 1 and 0.6 g of palladium chloride was used instead of 2.9 g of palladium chloride in the step of (5) Supporting of palladium, whereby 370 g of a catalyst "E" was obtained.

Example 6

Production of Catalyst "F"

A production process was conducted in the same manner as in Example 1 with the exception that an aqueous solution containing 0.9 g of chloroplatinic acid dissolved therein was used instead of the aqueous solution containing 2.7 g of chloroplatinic acid dissolved therein in the step of (2) Supporting of platinum on sulfated zirconium hydroxide in Example 1, 26.4 g of palladium chloride was used instead of 2.9 g of palladium chloride in the step of (5) Supporting of palladium, and the calcination was conducted at 550° C., whereby 375 g of a catalyst "F" was obtained.

Comparative Example 1

Production of Catalyst "G"

(1) Preparation of Sulfated Zirconium Hydroxide

To 4,000 g of 1N sulfuric acid was added 400 g of a zirconium hydroxide ($Zr(OH)_4$), followed by stirring for 30 minutes. After the stirring, the mixture was filtered and the resulting solid material was dried at 110° C. for a whole day and night to obtain 452 g of a sulfated zirconium hydroxide.

(2) Supporting of Platinum on Sulfated Zirconium Hydroxide

To an aqueous solution containing 2.7 g of chloroplatinic acid dissolved therein was added 375 g of the sulfated zirconium hydroxide, whereby impregnation with the Pt salt was effected. Thereafter, drying at 110° C. for a whole day and night afforded 377 g of a platinum-supported sulfated zirconium hydroxide.

(3) Molding of Catalyst

After 377 g of the platinum-supported sulfated zirconium hydroxide was thoroughly mixed with 68.7 g of commercially available pseudoboehmite (manufactured by Catalysts & Chemicals Ind. Co., Ltd.), 200 g of water was added thereto, followed by kneading. The kneaded mixture was extruded through a die having a diameter of 1.8 mm. The extruded product was dried at 110° C. for 2 hours to obtain 446 g of a precursor of a molded form.

(4) Stabilization of Molded Form

The molded form was calcined in a muffle furnace at 600° C. for 3 hours to obtain 354 g of a catalyst "G".

Comparative Example 2

Production of Catalyst "H"

(1) Preparation of Sulfated Zirconium Hydroxide

To 4,000 g of 1N sulfuric acid was added 400 g of a zirconium hydroxide ($Zr(OH)_4$), followed by stirring for 30 minutes. After the stirring, the mixture was filtered and the resulting solid material was dried at 110° C. for a whole day and night to obtain 452 g of a sulfated zirconium hydroxide.

(2) Molding of Catalyst

After 375 g of the sulfated zirconium hydroxide was thoroughly mixed with 68.7 g of commercially available pseudoboehmite (manufactured by Catalysts & Chemicals Ind. Co., Ltd.), 200 g of water was added thereto, followed by kneading. The kneaded mixture was extruded through a molding machine at a diameter of 1.8 mm and the product was dried at 110° C. for 2 hours to obtain 444 g of a precursor of a molded form.

(3) Stabilization of Molded Form

The molded form was calcined in a muffle furnace at 600° C. for 3 hours to obtain 352 g of a molded form.

(4) Supporting of Palladium

With 120 g of an aqueous solution containing 2.9 g of palladium chloride dissolved therein was impregnated 354 g of the molded form for 30 minutes. Thereafter, the impregnated molded form was dried under a nitrogen stream and then calcined at 450° C. for 3 hours to obtain 353 g of a catalyst "H".

Comparative Example 3

Production of Catalyst "I"

(1) Preparation of Sulfated Zirconium Hydroxide

To 4,000 g of 1N sulfuric acid was added 400 g of a zirconium hydroxide (Zr(OH)$_4$), followed by stirring for 30 minutes. After the stirring, the mixture was filtered and the resulting solid material was dried at 110° C. for a whole day and night to obtain 452 g of a sulfated zirconium hydroxide.

(2) Preparation of Palladium-Supported Sulfated Zirconium Hydroxide

To an aqueous solution resulting 2.9 g of palladium chloride dissolved therein was added 375 g of the sulfated zirconium hydroxide, whereby impregnation with the Pd salt was effected. Thereafter, drying at 110° C. for a whole day and night afforded 376 g of a palladium-supported sulfated zirconium hydroxide.

(3) Molding of Catalyst

After 376 g of the palladium-supported sulfated zirconium hydroxide was thoroughly mixed with 68.7 g of commercially available pseudoboehmite (manufactured by Catalysts & Chemicals Ind. Co., Ltd.), 200 g of water was added thereto, followed by kneading. The kneaded mixture was extruded through a molding machine at a diameter of 1.8 mm. The extruded product was dried at 110° C. for 2 hours to obtain 445 g of a precursor of a molded form.

(4) Stabilization of Molded Form

The precursor of a molded form was calcined in a muffle furnace at 600° C. for 3 hours to obtain 352 g of a molded form.

(5) Supporting of Platinum

With 120 g of an aqueous solution containing 2.7 g of chloroplatinic acid dissolved therein was impregnated 352 g of the molded form for 30 minutes. Thereafter, the impregnated molded form was dried under a nitrogen stream and then calcined at 450° C. for 3 hours to obtain 354 g of a catalyst "I" as a final product.

Comparative Example 4

Production of Catalyst "J"

(1) Preparation of Sulfated Zirconium Hydroxide

To 4,000 g of 1N sulfuric acid was added 400 g of a zirconium hydroxide (Zr(OH)$_4$), followed by stirring for 30 minutes. After the stirring, the mixture was filtered and the resulting solid material was dried at 110° C. for a whole day and night to obtain 452 g of a sulfated zirconium hydroxide.

(2) Preparation of Palladium-Platinum-Supported Sulfated Zirconium Hydroxide

To an aqueous solution containing 2.7 g of chloroplatinic acid and 2.9 g of palladium chloride dissolved therein was added 375 g of the sulfated zirconium hydroxide, whereby impregnation with the Pt salt and the Pd salt was effected. Thereafter, drying was effected at 110° C. for a whole day and night to obtain 378 g of a palladium-platinum-supported sulfated zirconium hydroxide.

(3) Molding of Catalyst

After 378 g of the palladium-platinum-supported sulfated zirconium hydroxide was thoroughly mixed with 68.7 g of commercially available pseudoboehmite (manufactured by Catalysts & Chemicals Ind. Co., Ltd.), 200 g of water was added thereto, followed by kneading. The kneaded mixture was extruded through a molding machine at a diameter of 1.8 mm and the extruded product was dried at 110° C. for 2 hours to obtain 447 g of a precursor of a molded form.

(4) Stabilization of Molded Form

The molded form was calcined in a muffle furnace at 600° C. for 3 hours to obtain 355 g of a catalyst "J".

Comparative Example 5

Production of Catalyst "K"

A process was conducted in the same manner as in Comparative Example 2 with the exception that the aqueous solution of 2.9 g of palladium chloride was replaced by a mixed aqueous solution of 2.9 g of palladium chloride and 2.7 g of chloroplatinic acid in the step of (4) Supporting of palladium in Comparative Example 2, whereby 354 g of a catalyst "K" was obtained.

Comparative Example 6

Production of Catalyst "L"

A production process was conducted in the same manner as in Example 1 with the exception that a temperature of 900° C. was adopted instead of the calcination temperature of 600° C. in the step of (5) Supporting of palladium in Example 1, whereby 348 g of a catalyst "L" was obtained.

The production conditions and physicochemical properties of the above catalysts A to F (Examples) and G to L (Comparative Examples) are summarized in Table 1 (Examples) and Table 2 (Comparative Examples). Each measuring apparatus used is as follows.

[Specific surface area and pore volume] a high-precision automatic gas adsorption apparatus "BELSORP 28", manufactured by BEL JAPAN, INC.

[Sulfur content] a sulfur content analyzer "SC-132", manufactured by LECO Co., Ltd.

[Crush strength of catalyst] a Kiya type hardness meter manufactured by Kiya Seisakusho. Twenty cylindrically molded catalyst samples having a length of about 2 mm were selected and the strength of the catalyst in the transverse direction was measured. The average value was taken as crush strength (kg/2 mm).

TABLE 1

| | Examples | | | | | |
| --- | --- | --- | --- | --- | --- | --- |
| | Example | | | | | |
| | 1 | 2 | 3 | 4 | 5 | 6 |
| Catalyst | A | B | C | D | E | F |
| Pt content (% by weight) | 0.3 | 0.4 | 1.5 | 0.2 | 2.5 | 0.1 |
| Pd content (% by weight) | 0.5 | 0.5 | 0.2 | 2.5 | 0.1 | 4.5 |
| Specific surface area (m$^2$/g) | 135 | 125 | 101 | 62 | 73 | 155 |
| Pore volume (cc/g) | 0.20 | 0.21 | 0.23 | 0.27 | 0.23 | 0.15 |
| Sulfur content (% by weight) | 2.8 | 2.5 | 3.0 | 0.7 | 1.2 | 3.5 |
| Crush strength (kg/2 mm) | 1.8 | 2.0 | 1.9 | 2.6 | 1.8 | 1.3 |

TABLE 2

| | Comparative Examples Comparative Example | | | | | |
|---|---|---|---|---|---|---|
| | 1 | 2 | 3 | 4 | 5 | 6 |
| Catalyst | G | H | I | J | K | L |
| Pt content (% by weight) | 0.3 | 0.0 | 0.3 | 0.3 | 0.3 | 0.3 |
| Pd content (% by weight) | 0.0 | 0.5 | 0.5 | 0.5 | 0.5 | 0.5 |
| Specific surface area ($m^2/g$) | 137 | 130 | 135 | 132 | 128 | 50 |
| Pore volume (cc/g) | 0.20 | 0.20 | 0.20 | 0.21 | 0.20 | 0.30 |
| Sulfur content (% by weight) | 2.8 | 2.7 | 2.5 | 2.2 | 2.7 | 0.5 |
| Crush strength (kg/2 mm) | 1.9 | 2.0 | 1.7 | 2.0 | 1.6 | 3.1 |

[Use Examples of Catalyst]

Each catalyst was packed into a fixed-bed flow-through type reactor having a catalyst packing capacity of 7 ml. A straight-run light naphtha taken from an atmospheric distillation apparatus was fed thereto as a feedstock hydrocarbon oil. The straight-run light naphtha had a sulfur content of 490 ppm by weight. The feedstock oil was fed under the following conditions to conduct isomerization.

Reaction temperature: 200° C.
Hydrogen pressure in reaction: 3.0 MPa
LHSV: $1.5/h^{-1}$
Hydrogen/oil ratio: 350 NL/L The composition of the oil taken at the outlet of the reactor at 20 hours and 150 hours after the start of oil feeding was analyzed by gas chromatography and the sulfur content after 150 hours was measured on the sulfur analyzer. The results are shown in Table 3 (Examples) and Table 4 (Comparative Examples).

TABLE 3

| | $C_5$ isomer ratio (%) | | S content (ppm by weight) |
|---|---|---|---|
| | 20 hours | 150 hours | 150 hours |
| Catalyst A (Example 1) | 70 | 70 | 0 |
| Catalyst B (Example 2) | 69 | 68 | 1 |
| Catalyst C (Example 3) | 71 | 69 | 1 |
| Catalyst D (Example 4) | 66 | 65 | 0 |
| Catalyst E (Example 5) | 65 | 64 | 1 |
| Catalyst F (Example 6) | 65 | 66 | 2 |

TABLE 4

| | $C_5$ isomer ratio (%) | | S content (ppm by weight) |
|---|---|---|---|
| | 20 hours | 150 hours | 150 hours |
| Catalyst G (Comparative Example 1) | 71 | 43 | 490 |
| Catalyst H (Comparative Example 2) | 68 | 55 | 4 |
| Catalyst I (Comparative Example 3) | 65 | 47 | 5 |
| Catalyst J (Comparative Example 4) | 66 | 60 | 3 |
| Catalyst K (Comparative Example 5) | 67 | 58 | 3 |
| Catalyst L (Comparative Example 6) | 47 | 45 | 9 |

$C_5$ isomer ratio (%)=[Content (% by weight) of iso-$C_5$ component in product oil/Content (% by weight) of all $C_5$ components in product oil]×100

The data given in the above show that when the catalysts produced according to the process of the invention, i.e., the catalysts A to F of Examples 1 to 6, are used to conduct isomerization, which is a representative reaction for solid acid catalysts, the $C_5$ isomer ratio in the product oil is maintained at 64% or higher even after 150 hours and thus these catalysts are excellent solid acid catalysts. At the same time, the sulfur content in the product oil is 1 ppm or lower, and this fact shows that isomerization and desulfurization are achieved simultaneously.

In Comparative Example 1 in which palladium was not supported, the $C_5$ isomer ratio after 20 hours is a high value of 71% but it drops to 43% after 150 hours. In this example, the sulfur content in the product oil is high, and this fact shows that desulfurization does not proceed. Even when palladium is incorporated, with the catalysts which are not produced according to the process of the invention (Comparative Examples 2, 3, 4, and 5), high $C_5$ isomer ratios are obtained at 20 hours after the start of the reaction, but the activity drops after 150 hours and the $C_5$ isomer ratios decrease to 60% or lower.

Industrial Applicability

The catalysts produced by the processes according to the invention can directly isomerize a straight-run naphtha produced from an atmospheric distillation apparatus although sulfur compounds are present therein in high concentration and also can simultaneously achieve hydrodesulfurization. Thus, a process in which the desulfurization pretreatment of a light naphtha, which has been indispensable to conventional isomerization of a light naphtha, is omitted can be carried out industrially advantageously.

The invention claimed is:

1. A process for producing a hydrodesulfurization and isomerization catalyst for a sulfur-containing hydrocarbon oil, which comprises supporting palladium on a composition comprising a platinum-supported sulfated zirconia and alumina, which comprises conducting the following (1)-(5) in the recited order:

(1) an alumina-mixing step of mixing a platinum-supported sulfated zirconium hydroxide and pseudoboehmite;
(2) a molding step of molding the resulting mixture into a catalyst molded form;
(3) a calcining step in which the molded form is calcined at a temperature of 200° C. to 800° C. for a period of 0.5 to 10 hours in an oxidizing atmosphere to stabilize it;
(4) a palladium-supporting step of supporting palladium on the calcined molded form; and
(5) a calcining step of the palladium-supported product in which the palladium-supported product is calcined at a temperature of 100° C. to 800° C. for a period of 0.5 to 10 hours in an oxidizing atmosphere to produce a final catalyst.

2. The process for producing a hydrodesulfurization and isomerization catalyst for a sulfur-containing hydrocarbon oil according to claim 1, wherein the final catalyst has a platinum content of 0.05 to 1.5% by weight and a palladium content of 0.05 to 0.5% by weight.

* * * * *